(12) United States Patent
Sohn

(10) Patent No.: US 10,565,496 B2
(45) Date of Patent: Feb. 18, 2020

(54) DISTANCE METRIC LEARNING WITH N-PAIR LOSS

(71) Applicant: NEC Laboratories America, Inc., Princeton, NJ (US)

(72) Inventor: Kihyuk Sohn, Fremont, CA (US)

(73) Assignee: NEC Corporation (JP)

( * ) Notice: Subject to any disclaimer, the term of this patent is extended or adjusted under 35 U.S.C. 154(b) by 505 days.

(21) Appl. No.: 15/385,283

(22) Filed: Dec. 20, 2016

(65) Prior Publication Data

US 2017/0228641 A1    Aug. 10, 2017

Related U.S. Application Data

(60) Provisional application No. 62/291,025, filed on Feb. 4, 2016.

(51) Int. Cl.
| | |
|---|---|
| *G06N 3/08* | (2006.01) |
| *G06N 3/04* | (2006.01) |
| *G06F 17/11* | (2006.01) |
| *G06N 7/00* | (2006.01) |

(52) U.S. Cl.
CPC .............. *G06N 3/08* (2013.01); *G06F 17/11* (2013.01); *G06N 3/04* (2013.01); *G06N 3/0454* (2013.01); *G06N 7/005* (2013.01)

(58) Field of Classification Search
CPC .......... G06N 3/08; G06N 3/04; G06N 3/0454; G06N 7/005; G06F 17/11
See application file for complete search history.

(56) References Cited

U.S. PATENT DOCUMENTS

| | | | | |
|---|---|---|---|---|
| 5,706,402 | A | * | 1/1998 | Bell ..................... G06K 9/6242 706/22 |
| 2011/0219012 | A1 | | 9/2011 | Yih et al. |
| 2015/0186495 | A1 | | 7/2015 | Abbas et al. |
| 2017/0124711 | A1 | * | 5/2017 | Chandraker ....... G06K 9/00201 |

OTHER PUBLICATIONS

Chu et al, Implementation of face recognition for screen unlocking on mobile devices, 2015, ACM (Year: 2015).*

(Continued)

*Primary Examiner* — Austin Hicks
(74) *Attorney, Agent, or Firm* — Joseph Kolodka

(57) ABSTRACT

A method includes receiving N pairs of training examples and class labels therefor. Each pair includes a respective anchor example, and a respective non-anchor example capable of being a positive or a negative training example. The method further includes extracting features of the pairs by applying a DHCNN, and calculating, for each pair based on the features, a respective similarly measure between the respective anchor and no example. The method additionally includes calculating a similarity score based on the respective similarity measure for each pair. The score represents similarities between all anchor points and positive training examples in the pairs relative to similarities between all anchor points and negative training examples in the pairs. The method further includes maximizing the similarity score for the anchor example for each pair to pull together the training examples from a same class while pushing apart the training examples from different classes.

9 Claims, 8 Drawing Sheets

(56) References Cited

OTHER PUBLICATIONS

Chopra, et al., "Learning a Similarity Metric Discriminatively, with Application to Face Verification", CVPR '05 Proceedings of the 2005 IEEE Computer Society Conference on Computer Vision and Pattern Recognition, Jun. 2005, 8 pages.

Goldberger, et al., "Neighbourhood Components Analysis", NIPS'04 Proceedings of the 17th International Conference on Neural Information Processing Systems, May 2004, 8 pages.

Guosheng H et al., "When Face Recognition Meets with Deep Learning: an Evaluation of convolutional Neural Networks for Face Recognition", ICCV 2015, pp. 142-150 (see pp. 144, 147).

\* cited by examiner

DISTANCE METRIC LEARNING WITH N-PAIR LOSS

RELATED APPLICATION INFORMATION

This application claims priority to U.S. Provisional Pat. App. Ser. No. 62/291,025 tiled on Feb. 4, 2016, incorporated herein by reference in its entirety.

BACKGROUND

Technical Field

The present invention relates to computer learning and more particularly to improving distance metric learning with N-pair loss.

Description of the Related Art

Deep metric learning has been tack ed in many ways but most notably, contrastive loss and triplet loss have been used for training objectives of deep learning. Previous approaches considered pairwise relationship between two different classes and suffered from slow convergence to an unsatisfactory local minimum. Thus, there is a need for improved metric learning.

SUMMARY

According to an aspect of the present invention, a computer-implemented method is provided. The method includes receiving, by a processor, N pairs of training examples and class labels for the training examples that correspond to a plurality of classes. Each of the N pairs includes a respective anchor example and further includes a respective non-anchor example capable of being a positive training example or a negative training example. The method further includes extracting, by the processor, features of the N pairs by applying a deep convolutional neural network to the N pairs and to the class labels. The method also includes calculating, by the processor for each of the N pairs based on the features, a respective similarly measure between the respective anchor example and the respective non-anchor example. The method additionally includes calculating, by the processor, a similarity score based on the respective similarity measure for each of the N pairs. The similarity score represents one or more similarities between all anchor points and all positive training examples in the N pairs relative to one or more similarities between all of the anchor points and all negative training examples in the N pairs. The method further includes maximizing, by the processor, the similarity score for the respective anchor example for each of the N pairs to pull together in a distribution space the training examples from a same one of the plurality of classes while pushing apart in the distribution space the training examples from different ones of the plurality of classes.

According to another aspect of the present invention, a system is provided. The system includes a processor. The processor is configured to receive N pairs of training examples and class labels for the training, examples that correspond to a plurality of classes. Each of the N pairs includes a respective anchor example and further includes a respective non-anchor example capable of being a positive training example or a negative training example. The processor is further configured to extract features of the N pairs by applying a deep convolutional neural network to the N pairs and to the class labels. The processor is also configured to calculate, for each of the N pairs based on the features, a respective similarly measure between the respective anchor example and the respective non-anchor example. The processor is additionally configured to calculate a similarity score based on the respective similarity measure for each of the N pairs. The similarity score represents one or more similarities between all anchor points and all positive training examples in the N pairs relative to one or more similarities between all of the anchor points and all negative training examples in the N pairs. The processor is further configured to maximize the similarity score for the respective anchor example for each of the N pairs to pull together in a distribution space the training examples from a same one of the plurality of classes while pushing apart in the distribution space the training examples from different ones of the plurality of classes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present invention is directed to improving distance metric learning with N-pair loss.

The present invention solves the fundamental machine learning problem of distance metric learning: when the number of output classes is extremely large, the total number of output classes is unknown or the distribution of output classes is variable over time using deep learning.

In an embodiment, and in contrast to prior art approaches, the present invention considers N pairs of examples from N different classes at once.

In an embodiment, the present invention introduces a new objective function for deep metric learning. The objective function allows faster convergence to a better local optimum.

The present invention provides an N-pair loss for deep metric learning. The present invention allows training of deep neural networks such that it trains to pull examples from the same class together while pushing those from different classes apart. The present invention pushes not just one negative example at each update but N-1 negative examples from all different classes based on their relative distances to the reference example.

Figure 1:
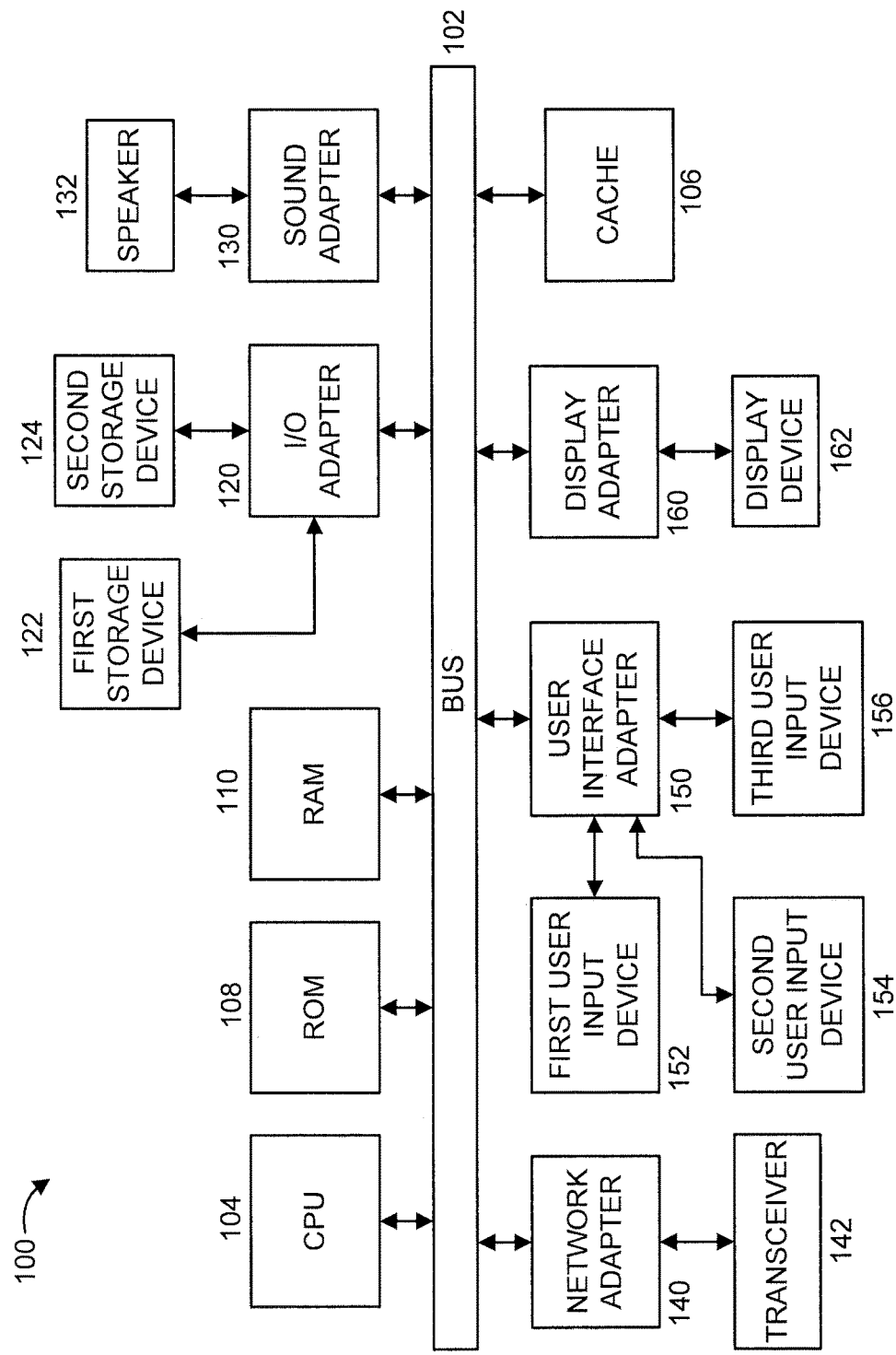
FIG. 1 shows a block diagram of an exemplary processing system 100 to which the present invention may be applied, in accordance with an embodiment of the present invention.

FIG. 1 shows a block diagram of an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 acid 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input, device or different types of user input devices. The user input devices 152, 154, and 156 are used to input and output information to and from system 100.

Of course, the processing system 100 may also include ether elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
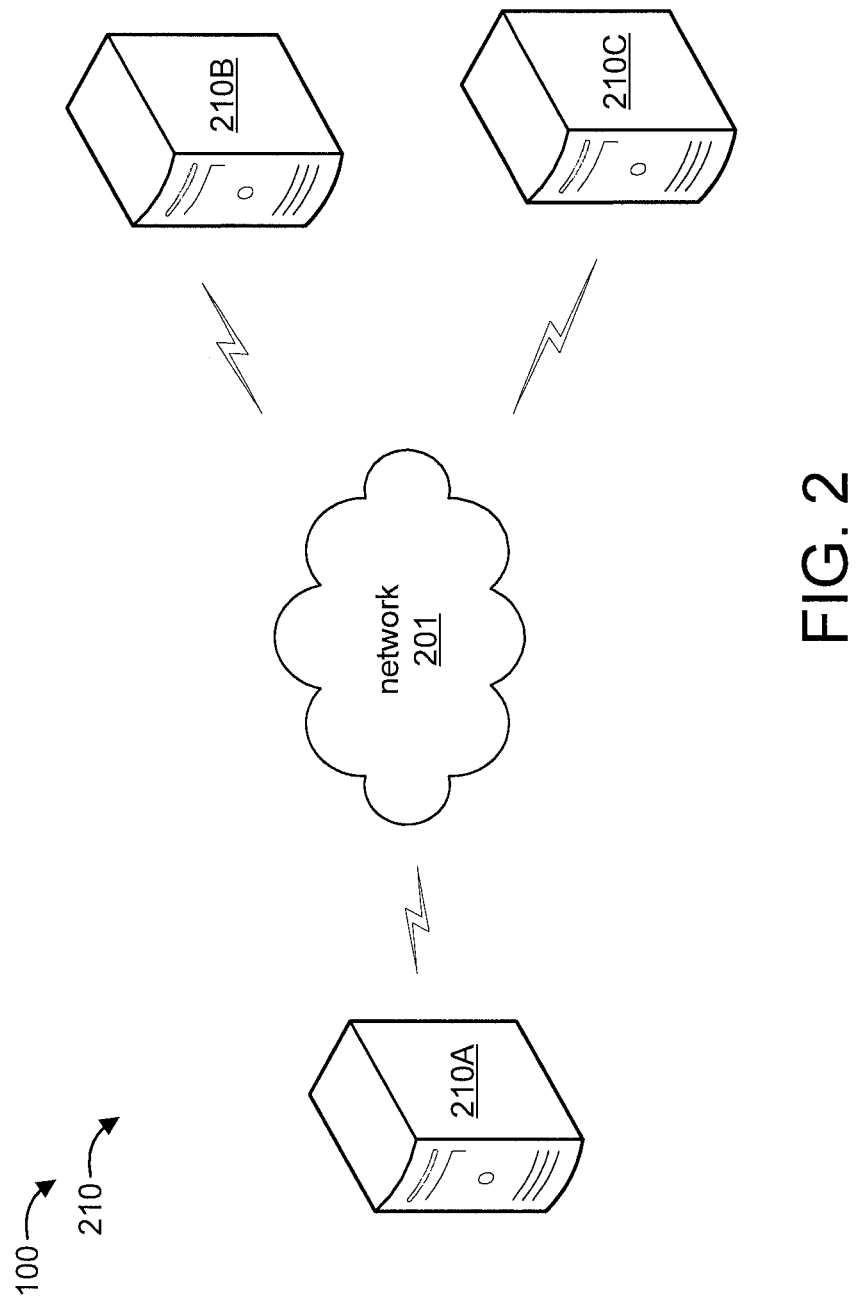
FIG. 2 shows an exemplary environment 200 to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
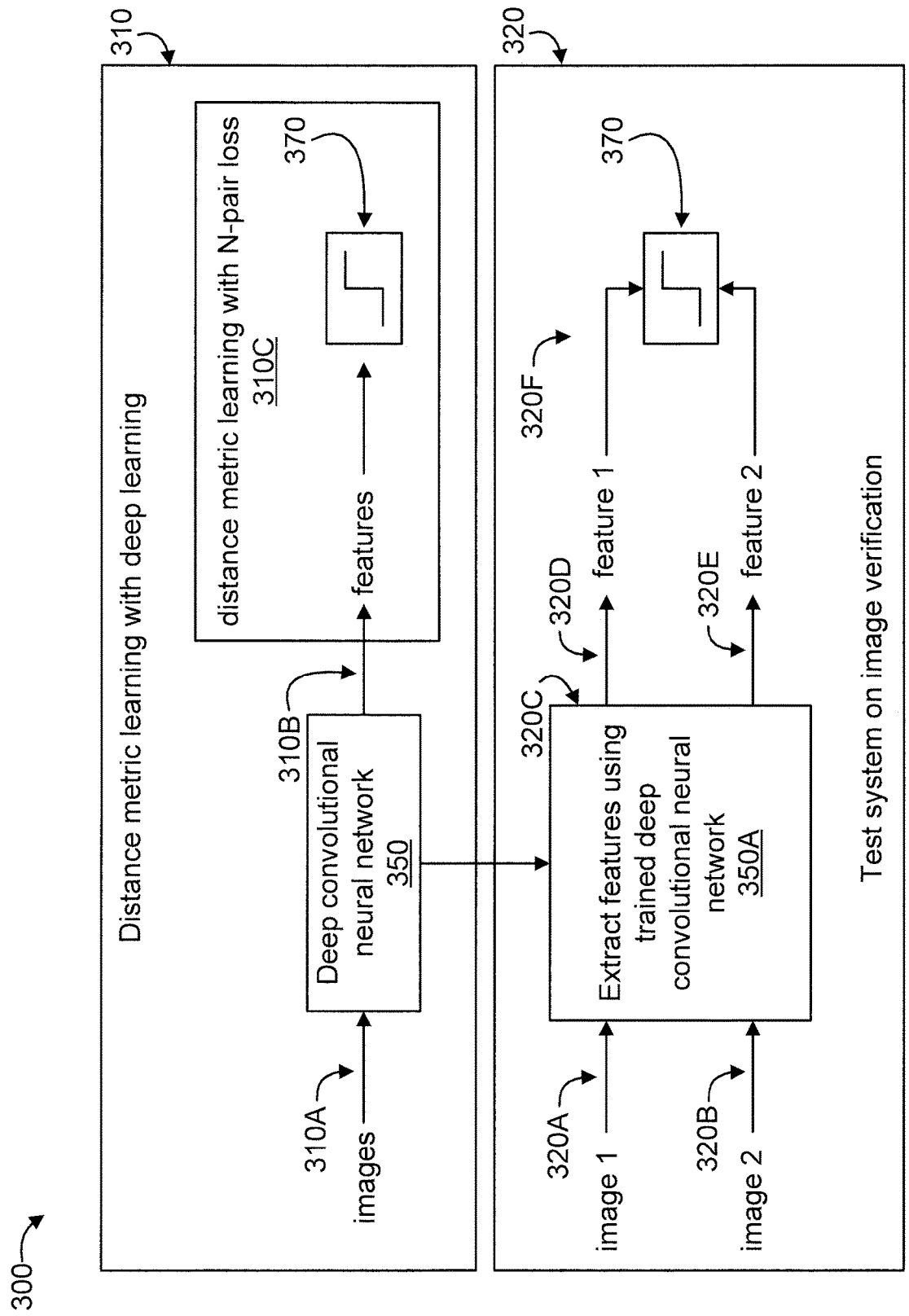
FIG. 3 shows a high-level block/flow diagram of an exemplary system/method 300 for deep, metric learning with N-pair loss, in accordance with an embodiment of the present invention.
Figure 4:
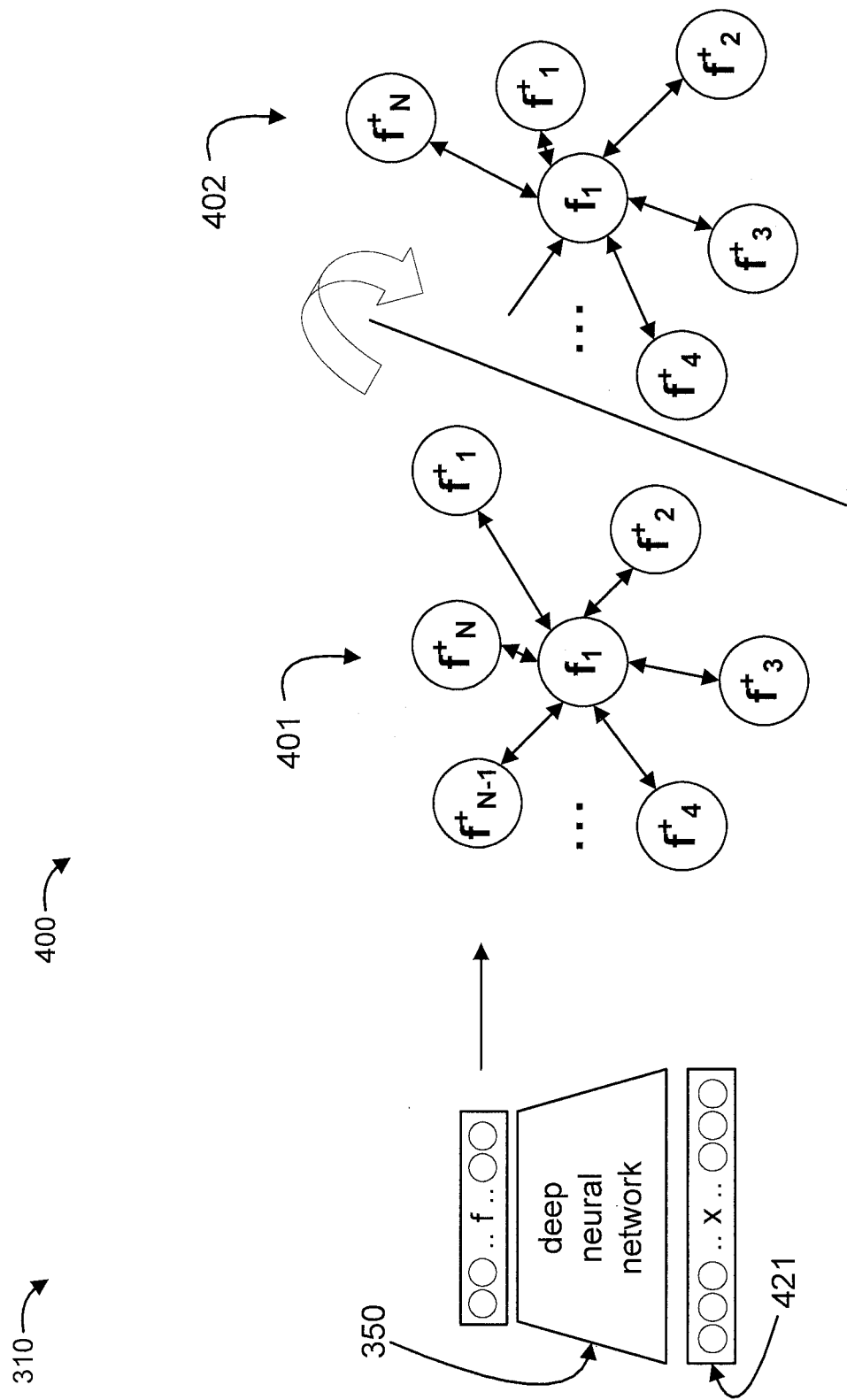
FIG. 4 further shows step 310 of method 300 of FIG. 3, in accordance with an embodiment of the present invention. In particular, FIG. 4 further shows distance metric learning with N-pair loss 400, in accordance with an embodiment of the present invention.
Figure 6:
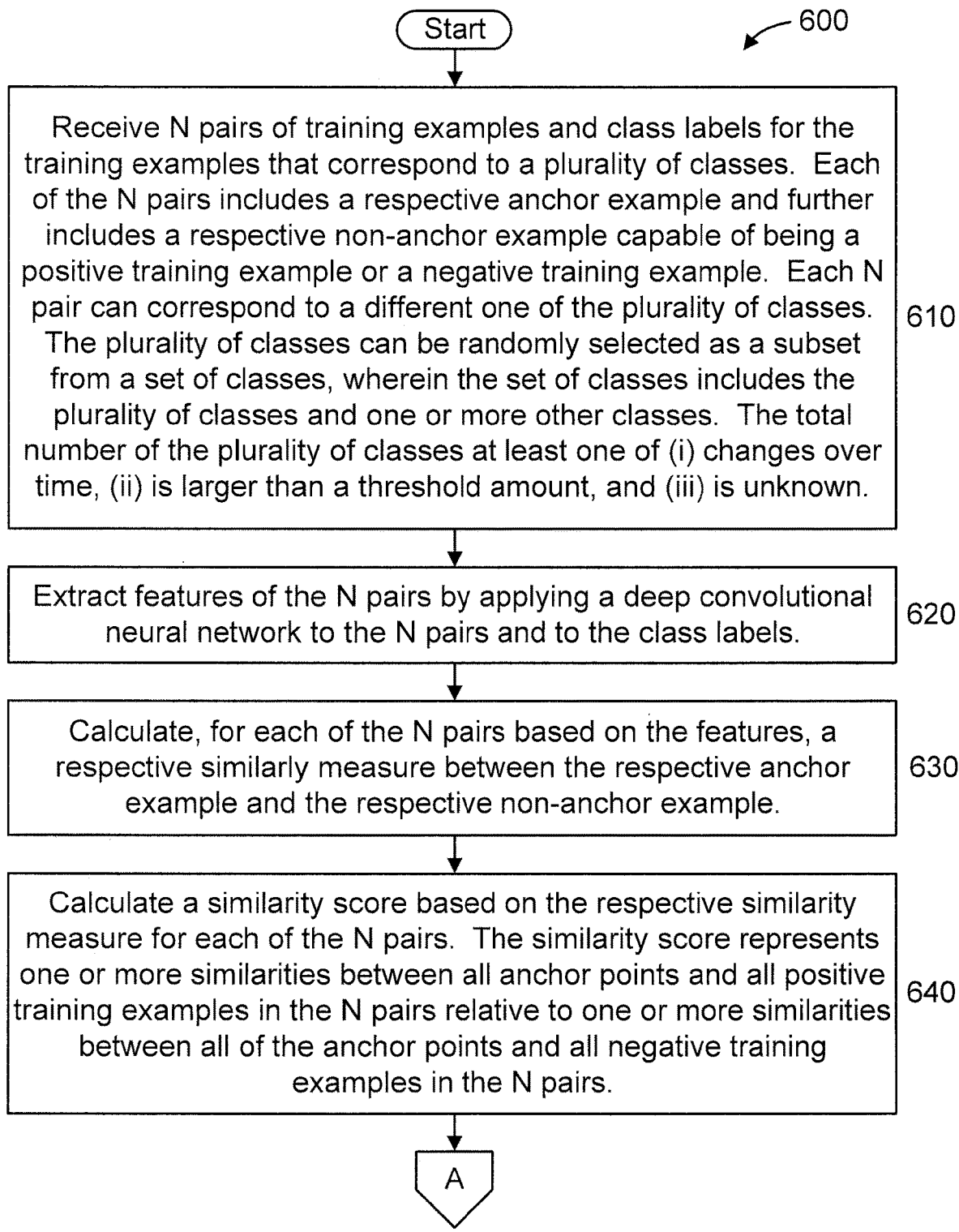
FIGS. 6-8 show a flow diagram of a method 600 for deep metric learning with N-pair loss, in accordance with an embodiment of the present invention.
Figure 7:
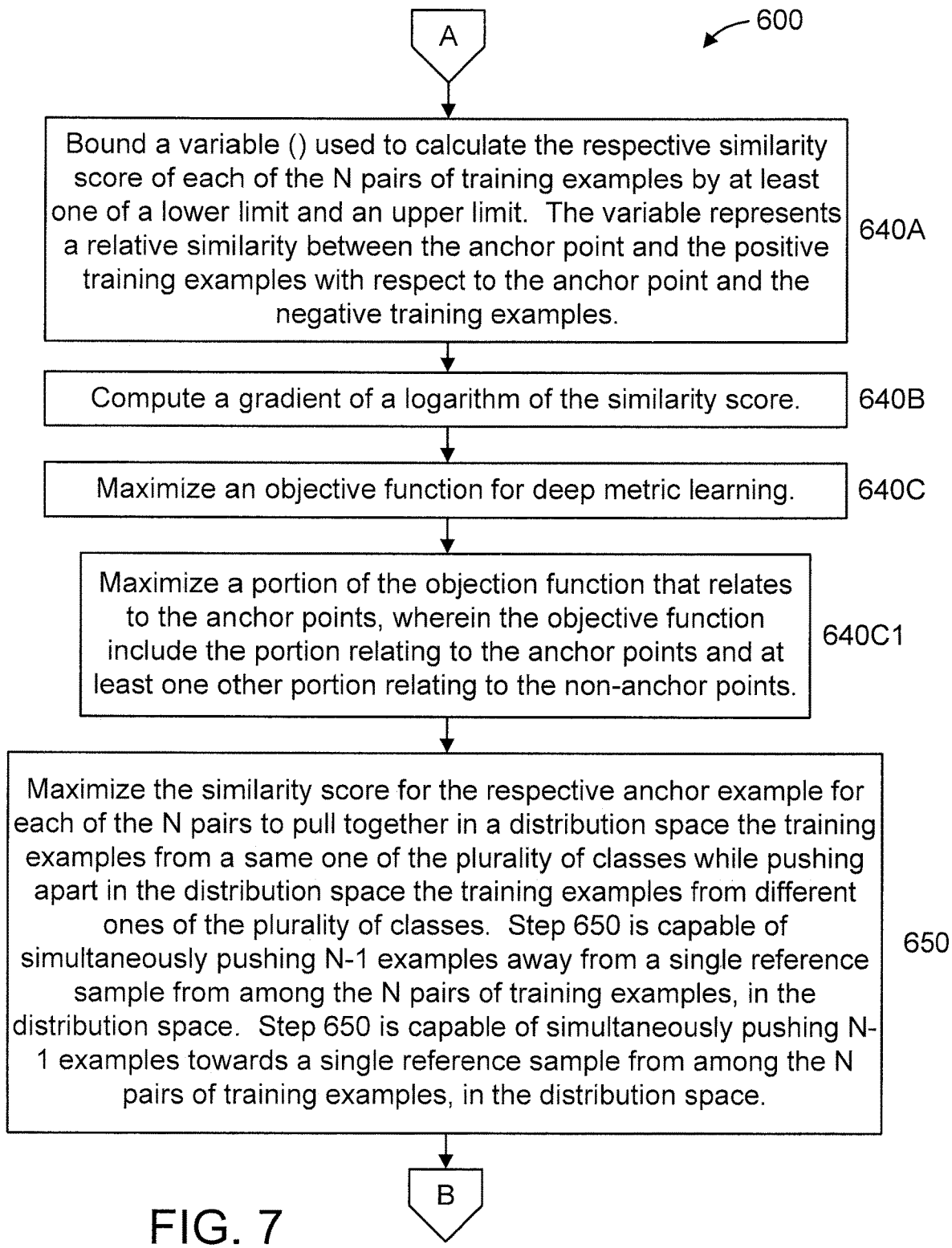
Figure 8:
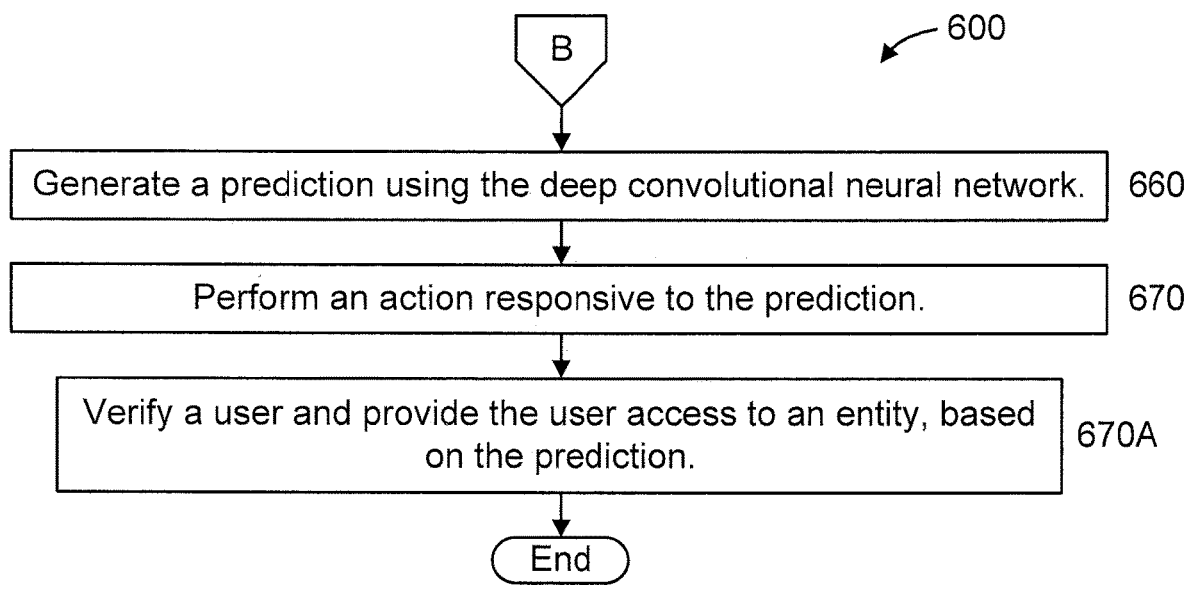

Further, it is to be appreciated that processing system 100 may perform at least part of the method described herein including, for example., at least part of method 300 of FIG. 3 and/or at least part of method 400 of FIG. 4 and/or at least part of method 600 of FIGS. 6-8. Similarly, part or all of environment 200 may be used to perform at least part of method 300 of FIG. 3 and/or at least part of method 400 of FIG. 4 and/or at least part of method 600 of FIGS. 6-8.

FIG. 2 shows an exemplary environment 200 to which the present invention can be applied, in accordance with an embodiment of the present invention. The environment 200 is representative of a computer network to which the present invention can be applied. The elements shown relative to FIG. 2 are set forth for the sake of illustration. However, it is to be appreciated that the present invention can be applied to other network configurations as readily contemplated by one of ordinary skill in the art given the teachings of the present invention provided herein, while maintaining the spirit of the present invention.

The environment 200 at least includes a set of computer processing systems 210. The computer processing systems 210 can be any type of computer processing system including, but not limited to, servers, desktops, laptops, tablets, smart phones, media playback devices, and so forth. For the sake of illustration, the computer processing systems 210 include server 210A, server 210B, and server 210C.

In an embodiment, the present invention improves distance metric learning with N-pair loss. The present invention can employ any of the computer processing systems 210 to perform distance metric learning with deep learning as described herein. In an embodiment, one of the computer processing systems 210 can classify information received by other ones of the computer processing systems.

In the embodiment shown in FIG. 2, the elements thereof are interconnected by a network(s) 201. However, in other embodiments, other types of connections can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

FIG. 3 shows a high-level block/flow diagram of an exemplary system/method 300 for deep metric learning with N-pair loss, in accordance with an embodiment of the present invention.

At step 310, perform distance metric learning with deep learning.

In an embodiment, step 310 includes steps 310A, 310B, and 310C.

At step 310A, provide images to a deep convolutional neural network 350. The images include N pairs of examples from N different classes at once.

At step 310B, extract features from the images.

At step 310C, perform distance metric learning with N-pair loss on the features and form a classifier 370.

At step 320, test the system on image verification.

In an embodiment, step 320 includes steps 320A, 320B, 320C, 320D, 320E, and 320F.

At step 320A, receive a first image (image 1).

At step 320B, receive a second image (image 2).

At step 320C, extract features using a trained deep convolutional neural network 350A. The deep convolutional neural network 350 is trained to become trained deep convolutional neural network 350A, At step 320D, output a first feature (feature 1).

At step 320E, output a second feature (feature 2).

At step 320F, input the features (feature 1 and feature 2) and into the classifier 370.

The classifier 370 can be used to generate predictions, based on which, certain actions can be taken (e.g., see, FIG. 6).

Regarding step 310, it is to be appreciated that the same differs from previous approaches in at least using N pairs of examples from N different classes at once.

Regarding step 320, it is to be appreciated that the N-pair loss can be viewed as a form of neighborhood component analysis.

FIG. 4 further shows step 310 of method 300 of FIG. 3, in accordance with an embodiment of the present invention. In particular, FIG. 4 further shows distance metric learning with N-pair loss 400, in accordance with an embodiment of the present invention, The deep convolutional neural network 350 receives N pairs of images 421 from N different classes at once. In FIG. 4, the reference numeral 401 shows features before training with N-pair loss, and the reference numeral 402 shows the feature after training with N-pair loss.

In FIG. 4, the following notations apply:
x: input image;
f: output feature;
fi: example from i-th pair;
fi$^+$: positive example from i-th pair; with
fi's having different class labels.

Figure 5:
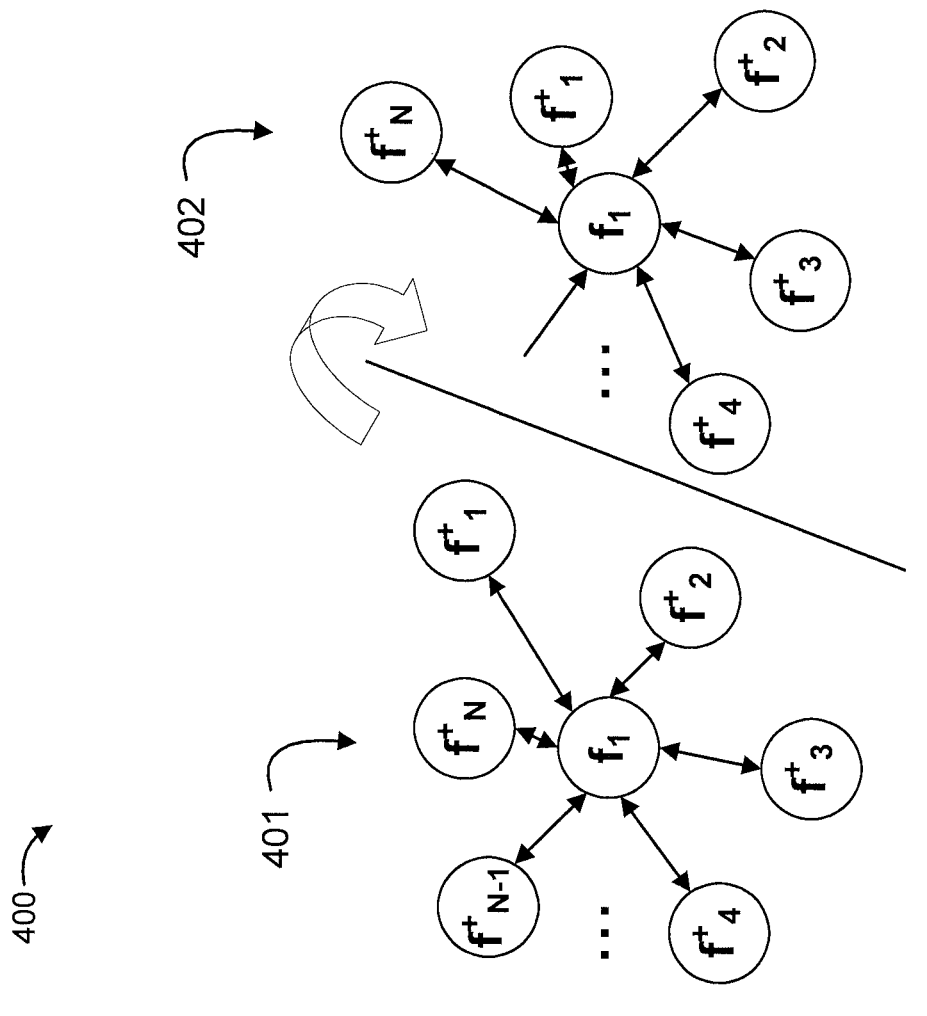
FIG. 5 is a diagram graphically showing the N-pair loss 400 of FIG. 4 in accordance with an embodiment of the present invention versus a conventional triplet loss 599 in accordance with the prior art.
Figure 5:
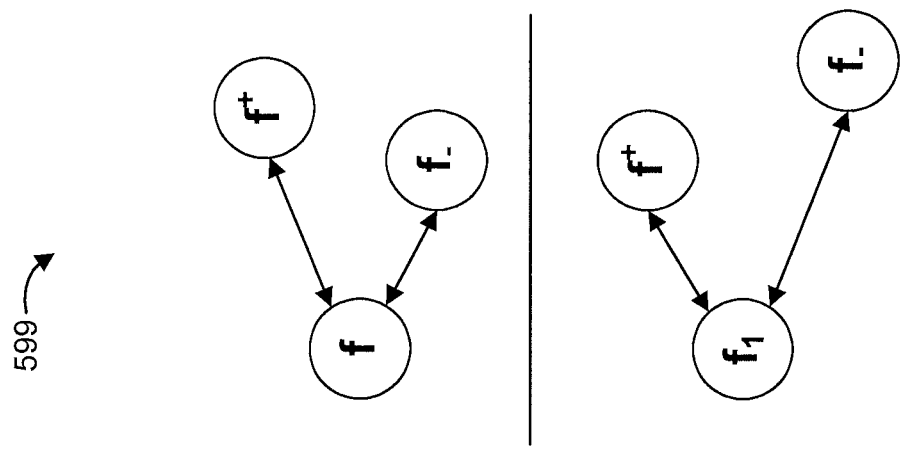

In an embodiment, N-pair loss can be defined as follows:

FIG. 5 is a diagram graphically showing the N-pair loss 400 of FIG. 4 in accordance with an embodiment of the present invention versus a conventional triplet loss 599 in accordance with the prior art.

The conventional triplet loss 599 is equivalent to a 2-pair loss.

The 2-pair loss is a generalization to a N-pair loss for N>2.

The following equations apply:

FIGS. 6-8 show a flow diagram of a method 600 for deep metric learning with N-pair loss, in accordance with an embodiment of the present invention.

At step 610, receive N pairs of training examples and class labels for the training examples that correspond to a plurality of classes. Each of the N pairs includes a respective anchor example and further includes a respective non-anchor example capable of being a positive training example or a negative training example. In an embodiment, each of the N pairs of the training examples can correspond to a different one of the plurality of classes. In an embodiment, the plurality of classes, can be randomly selected as a subset from a set of classes, wherein the set of classes, includes the plurality of classes and one or more other classes. In an embodiment, the total number of the plurality of classes at least one of (i) changes over time, (ii) is larger than a threshold amount, and (iii) is unknown.

At step 620, extract features of the N pairs by applying a deep convolutional neural network to the N pairs and to the class labels.

At step 630, calculate, for each of the N pairs based on the features, a respective similarly measure between the respective anchor example and the respective non-anchor example.

At step 640, calculate a similarity score based on the respective similarity measure for each of the N pairs. The similarity score represents One or more similarities between all anchor points and all positive training examples in the N pairs relative to one or more similarities between all of the anchor points and all negative training examples in the N pairs.

In an embodiment, step 640 includes one or more of steps 640A, 640B, and 640C.

At step 640A, bound a variable ($p_i$) used to calculate the respective similarity score of each of the N pairs of training examples by at least one of a lower limit and an upper limit, the variable representing a relative similarity between the anchor point and the positive training examples with respect to the anchor point and the negative training examples.

At step 640B, compute a gradient, of a logarithm of the similarity score.

At step 640C, maximize an objective function for deep metric learning.

In an embodiment, step 640C includes step 640C1.

At step 640C1, maximize a portion of the objection function that relates to the anchor points, wherein the objective function include the portion relating to the anchor points and at least one other portion relating to the non-anchor points.

At step 650, maximize the similarity score for the respective anchor example for each of the N pairs to pull together in a distribution space, the training examples from a same one of the plurality of classes while pushing apart in the distribution space the training examples from different ones of the plurality of classes, in an embodiment, step 650 is capable of simultaneously pushing N-1 examples away from a single reference sample from among the N pairs of training examples, in the distribution space. In an embodiment, step 650 is capable of simultaneously pushing N-1 examples towards a single reference sample from among the N pairs of training examples, in the distribution space.

At step 660, generate a prediction using the deep convolutional neural network. For example, generate a facial recognition prediction, a speech recognition prediction, a speaker recognition prediction, and so forth.

At step 670, perform an action responsive to the prediction. As appreciated by one of ordinary skill in the art, the action taken is dependent upon the implementation. For example, access to an entity including, but not limited to, a device, a system, or a facility, can be granted responsive to the prediction. It is to be appreciated that the preceding actions are merely illustrative and, thus, other actions can also be performed as readily appreciated by one of ordinary skill in the art, while maintaining the spirit of the present invention.

In an embodiment, step 670 includes step 670A.

At step 670A, verify a user and provide the user access to an entity, based on the prediction.

A description will now be given regarding supervised deep metric learning, in accordance with an embodiment of the present invention.

The description regarding, supervised deep metric learning will commence with a description regarding contrastive and triplet loss.

Supervised deep metric learning aims to learn an embedding vector representation of the data using deep neural networks that preserves the distance between examples from the same class small and those from different classes large. The contrastive loss and the triplet loss functions have been used to train deep embedding networks:

$$\mathcal{L}_{contrastive}^m(x_i, x_j; f(\cdot;\theta)) = \begin{cases} \frac{1}{2}\|f_i - f_j\|_2^2, & \text{if } y_i = y_j \\ \frac{1}{2}[m - \|f_i - f_j\|_2]_+^2, & \text{if } y_i \neq y_j \end{cases} \quad (1)$$

$$\mathcal{L}_{tri}^m(x, x^+, x^-; f(\cdot; \theta)) = [\|f - f^+\|_2^2 - \|f - f^-\|_2^2 + m]_+ \quad (2)$$

where $f(\bullet; \theta): X \to \mathbb{R}^k$ is an embedding kernel defined by deep neural networks, and $y_i \in \{1, \ldots, L\}$'s are the label of the data $x_i \in X$. Herein, $x^+$ and $x^-$ are used to represent positive and negative examples of x, i.e., $y^+=y$ and $y^-\neq y$, respectively. $[d]_+ = \max\{0; d\}$ and $m > 0$ is a tuning parameter for margin. For simplicity, $f = f(x)$ is used to denote embedding vector representation of x while inheriting all superscripts and subscripts when exist. Two objective functions are similar in the sense that they both optimize embedding kernels to preserve the distance between examples in the label space to the embedding space, but the triplet loss can be considered as a relaxation of the contrastive loss since it only cares the relative margin of distances between positive and negative pairs, not their absolute values. The loss functions are differentable with respect to the kernel parameters $\theta$, and therefore they can be readily used as an objective function for training deep neural networks.

Although it sounds straightforward, applying contrastive loss or triplet loss functions to train deep neural networks that can provide highly discriminative embedding; vector is non-trivial because the margin constraints of the above loss functions can be easily satisfied for most of the training pairs or triplets after few epochs of training. To avoid bad local minima, different data selection methods have been explored such as an online triplet selection algorithm that selects (semi-) hard negative but all positive examples within each mini-batch containing few thousands of exemplars. Although the data selection step is essential, it becomes more inefficient for deep metric learning since each data sample should go through the forward pass of deep neural networks to compute the distance.

A description will now be given regarding N-pair Loss for Deep Metric Learning, in accordance with an embodiment of the present invention. Also, theoretical insight is provided regarding why N-pair loss is better than other existing loss functions for deep metric learning by showing relations to those loss functions, such as triplet loss and softmax loss.

A description of N-pair loss will now be given. Consider N pairs of training examples $\{(x_i, x_i^+)\}_{i=1}^N$ and labels $\{(y_i, y_i^+)\}_{i=1}^N$. By definition, $y_i = y_i^+$ and it is presumed that none of the pairs of examples are from the same class, i.e., $y_i \neq y_j, \forall i \neq j$. The similarity measure between the anchor point $x_i$ and the positive or negative points $\{x_j^+\}_{j=1}^N$ is defined as follows:

$$\hat{p}_{ij} = \exp(f_i^T f_j^+) \quad (3)$$

and the score $p_i \triangleq p_{ii}$ is a normalized self-similarity, ie., $$p_{ij} = \frac{\hat{p}_{ij}}{\sum_{l=1}^N \hat{p}_{il}} = \frac{\exp(f_i^T f_j^+)}{\sum_{l=1}^N \exp(f_i^T f_l^+)} \quad (4)$$

Note that $p_i$ is bounded by (0, 1) and it represents the relative similarity between anchor and positive points to the similarities between anchor and negative points. Maximizing the score of all anchor points in N-pair training subset pulls the examples from the same class together, but at the same time, it pushes the examples from different classes away based on their relative dissimilarity, i.e., negative examples in the proximity of anchor point will be pushed away than those already far enough, as illustrated in FIG. 4. After all, the N-pair loss is defined as follows:

$$\mathcal{L}_{N-pair}(\{(x_i, x_i^+)\}_{i=1}^N) = \frac{1}{N}\sum_{i=1}^N -\log p_i \quad (5)$$

The gradient of $\log p_i$ w.r.t. $f_i, f_i^+, f_j$ be derived as follows:

$$\frac{\partial \log p_i}{\partial f_i} = f_i^+ - \sum_{j=1}^N p_{ij} f_j^+ \quad (6)$$

$$\frac{\partial \log p_i}{\partial f_i^+} = (1 - p_i) f_i \quad (7)$$

$$\frac{\partial \log p_i}{\partial f_j^+} = -p_{ij} f_i \quad (8)$$

and the gradient w.r.t. $\theta$ can be computed by chain-rule.

TABLE 1 shows a comparison of loss functions for deep metric learning. 2-pair loss is equivalent to triplet loss under $\epsilon$ convergence criteria, while its score function is an approximation to that of N-pair loss for N>2.

TABLE 1

| triplet loss | $[\|f - f^+\|_2^2 - \|f - f^-\|_2^2 + m]_+$ |
|---|---|
| 2-pair loss | $-\log\left[\frac{\exp(f^T f^+)}{\exp(f^T f^+) + \exp(f^T f^-)}\right]$ |
| N-pair loss | $-\log\left[\frac{\exp(f^T f^+)}{\exp(f^T f^+) + \sum_{i=1}^N \exp(f_i^T f_i^+)}\right]$ |

A description will now be given regarding a comparison of N-pair loss to triplet loss.

To illustrate the present invention, N-pair loss is described with respect to triplet loss and softmax loss.

Regarding the comparison of N-pair loss to triplet loss, a description of triplet loss and 2-pair loss will now be given Relation between loss functions can be demonstrated by showing the equivalence between two sets of optimal embedding kernels with respect to each loss function (although the optimal sets of embedding kernels for two loss functions are equivalent). To proceed, optimality conditions for loss functions are defined as follows:

$$\mathcal{F}_{tri}^m = \{f | m_{tri}^m(x, x^{30}, x^-; f) = 0, \forall (x, x^{30}, x^-)\} \quad (9)$$

$$F_{2-pair}^\epsilon = \{f | \mathcal{L}_{2-pair}^\epsilon(x_1, x_1^+, x_2, x_2^+) = 0, \forall (x_1, x_1^+, x_2, x_2^+)\} \quad (10)$$

where $\mathcal{L}_{2-pair}^\epsilon = \frac{1}{2}\sum_{i=1}^2 [-\log p_i - \epsilon]_+$ and embedding kernels f are restricted to have unit l2 norm for both 2-pair and triplet losses. In the following, it is shown that $F_{tri}^m$ and $f_{2-pair}^\epsilon$ are equivalent when $$\epsilon = -\log \sigma\left(\frac{m}{2}\right).$$

$F_{tri}^m \subset F_{2-pair}^\epsilon$: Let $f \in F_{tri}^m$ and consider any valid 2-pair sample $\{(x_1, x_1^+), (x_2, x_2^+)\}$. Since $(x_1, x_1^+ x_2^+)$ forms a valid triplet sample, we have the following:

$$\mathcal{F}^m_{tri}(x_1, x_1^+, x_2^+; f) = 0$$

$$\Longleftrightarrow \|f_1 - f_2^+\|_2^2 - \|f_1 - f_1^+\|_2^2 \geq m \quad (11)$$

$$\Longleftrightarrow -f_1^T f_2^+ + f_1^T f_1^+ \geq \frac{m}{2} \quad (12)$$

$$\Longleftrightarrow \sigma f_1^T f_1^+ - f_1^T f_2^+ \geq \sigma \frac{m}{2} \quad (13)$$

$$\Longleftrightarrow -\log p_1 \leq \log \sigma\left(\frac{m}{2}\right) \quad (14)$$

and this proves $\epsilon F_{2\text{-}pair}^{\epsilon}$.

$F_{2\text{-}pair}^{\epsilon} \subset F_{tri}^{m}$: Similarly, let $f \in F_{2\text{-}pair}^{\epsilon}$ and consider any valid triplet sample $(x_1, x_1^+, x_2^+)$. For any $x_2$ with $y_2 = y_2^+$, a 2-pair sample $\{(x_1, x_1^+), (x_2, x_2^+)\}$ can be built that satisfies the following:

$$\mathcal{L}^{\epsilon}_{2\text{-}pair}(x_1, x_1^+, x_2, x_2^+) = 0$$

$$\Longrightarrow -\log p_1 \leq \epsilon = -\log \sigma\left(\frac{m}{2}\right) \Longleftrightarrow \ldots \quad (15)$$

$$\Longleftrightarrow \|f_1 - f_2^+\|_2^2 - \|f_1 - f_1^+\|_2^2 \geq m \quad (16)$$

where details its Equation (15) are omitted as it repeats Equation (11)-(14) backwardly. Finally, this proves $f \in \mathcal{F}_{tri}^m$.

A description will now be given regarding insight from softmax loss.

The softmax loss with L classes is written as follows:

$$\mathcal{L}_{softmax}(x_i, y_i) = -\log P(y_i | x_i) \quad (17)$$

$$P\left(y_i | x_i; f(\cdot; \theta, \{w_l\}) = \frac{\exp(f_i^T w_{y_i})}{\sum_{l=1}^{L} \exp(f_i^T w_l)}\right)$$

where $w_l \in \mathbb{R}^R$ is a weight vector or a template for class l. It is often inefficient or impractical to compute the exact partition function $Z(x_i) = \Sigma_{l=1}^L \exp(f_i^T W_l)$ at training when L is very large. For such cases, the exact partition function can be approximated by randomly selecting a small subset of N templates including a ground-truth template as follows:

$$\mathcal{L}^N_{softmax}(x_i, y_i) = \mathbb{E}_s[-\log P_s(y_i | x_i)] \quad (18)$$

$$P_s(y_i | x_i) = \frac{\exp(f_i^T w_{y_i})}{z_s(x_i)}, Z_s(x_i) = \sum_{l \in S} \exp(f_i^T w_l)$$

where $S \subset \{1, \ldots, L\}$, $|S|=N$ and $y_i \in S$. The local partition function $Z_S(x)$ is less than $Z_{(x)}$ for any S, and the approximation becomes more accurate with larger N (noting that advanced subset sampling methods, such as importance sampling and bashing can be used to reduce approximation error with small N). This provides a valuable insight when N-pair loss is compared to 2-pair loss (or M-pair loss for M<N) since the self-similarity score of 2-pair loss can be viewed as an approximation to that of N-pair loss. In other words, any self-similarity score of N-pair loss can be approximated with those of 2-pair loss, but none of them is tight:

$$\frac{\exp(f_i^T f_i^+)}{\sum_{i=1}^{N} \exp(f_i^T f_i^+)} < \frac{\exp(f_i^T f_i^+)}{\exp(f_i^T f_i^+) + \exp(f_i^T f_j^+)}$$

$\forall j \in \{1, \ldots, N\} \backslash \{i\}$. This implies that the actual score of N-pair loss could be concealed behind the over valued score of the model when it is trained with 2-pair loss, and therefore the model is likely to be sub-optimal. It has been determined that the 2-pair loss, significantly under fits to the training data compared to the N-pair loss with N>2 or softmax loss models.

A description will now be given regarding implications of the present invention with respect to various relations.

The implications of these relations are summarized below:

1. The optimal set of embedding kernels for 2-pair loss and triplet loss are equivalent and the performance of the models trained with these loss functions would be similar.
2. The M-pair loss is an approximation of N-pair loss for M<N.

A description will now be given regarding L2-Norm Regularization.

Note that the score function in Equation (4) is, not designed to be invariant to the norm of embedding vectors. In other words, the score function can be made to be arbitrarily close to 1 or 0 by re-scaling embedding vectors. This implies that the self-similarity score function can be maximized by increasing the norm of embedding vectors rather than finding right direction, and it is important to regularize the norm of the embedding vector to avoid such situation, e.g., 12 normalization on embedding vectors to compute triplet loss. However, for N-pair loss, applying, 12 normalization makes optimization very difficult since the self-similarity score is upper bounded by $$\frac{\exp(1)}{\exp(1) + (N-1)\exp(-1)}$$

(for example, the upper bound is 0.88 when N=2, but it decreases to 0.105 when N=64). Instead we regularize by adding following penalty term $$\frac{\lambda}{2N} \sum_{i=1}^{N} \|f_i\|_2^2 + \|f_i^+\|_2^2$$

to objective function that promotes the 12-norm of embedding vectors to be small.

A description will now be given regarding competitive/commercial values of the solution achieved by the present invention.

The present invention allows efficient training by (1) removing hard negative data mining, (2) removing computationally and parameter heavy softmax layer, and (3) faster convergence than previous deep metric learning approaches.

The present invention is effective for technologies such as face recognition where the number of output classes (e.g., identity) is extremely large.

The present invention is effective for online learning where the number of output classes is unknown or changing over time.

Rather than using two pairs of examples with hard negative mining, N pairs of examples are used front a random subset of classes that enables pushing examples from different classes apart quickly.

Embodiments described herein may be entirely hardware, entirely software or including both hardware and software elements. In a preferred embodiment, the present invention is implemented in software, which includes but is not limited to firmware, resident software, micro code, etc.

Embodiments may include a computer program product accessible from a computer-usable or computer-readable medium providing program code for use by or in connection with a computer or any instruction execution system. A computer-usable or computer readable medium may include, any apparatus that stores, communicates, propagates, or transports the program for use by Of in connection with the instruction execution system, apparatus, or device. The medium can be magnetic, optical, electronic, electromagnetic, infrared, or semiconductor system (or apparatus or device) Of a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, fiber configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and: or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output I/O devices (including but not limited to keyboards, displays, pointing devices, etc.) may be coupled to the system either directly or through intervening I/O controllers.

Network adapters may also be coupled to the system to enable the data, processing system to become coupled to other data processing systems or remote printers or storage devices through intervening private, or public networks. Modems, cable modem and Ethernet cards are just a few of the currently available types of network adapters.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A,B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options al and C) only, or the selection of all three options (A and B and C). This may be extended, as readily apparent by one of ordinary skill in this acid related arts, for as many items listed, The foregoing is to be understood as being in every respect illustrative and exemplary, but not restrictive, and the scope of the, invention disclosed herein is not to be determined from the Detailed Description, but rather from the claims as interpreted, according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method, comprising:
receiving, by a processor, N pairs of training examples and class labels for the training examples that correspond to a plurality of classes, wherein each of the N pairs includes a respective anchor example and further includes a respective non-anchor example capable of being a positive training example or a negative training example;
extracting, by the processor, features of the N pairs by applying a deep convolutional neural network to the N pairs and to the class labels;
calculating, by the processor for each of the N pairs based on the features, a respective similarly measure between the respective anchor example and the respective non-anchor example;
calculating, by the processor, a similarity score based on the respective similarity measure for each of the N pairs, the similarity score representing one or more similarities between all anchor points and all positive training examples in the N pairs relative to one or more similarities between all of the anchor points and all negative training examples in the N pairs; and
maximizing, by the processor, the similarity score for the respective anchor example for each of the N pairs to pull together in a distribution space the training examples from a same one of the plurality of classes while pushing apart in the distribution space the training examples from different ones of the plurality of classes; and
verifying a user and providing the user access to an entity, based on a prediction generated using the deep convolutional neural network.

2. The computer-implemented method of claim 1, wherein each of the N pairs of training examples corresponds to a different one of the plurality of classes.

3. The computer-implemented method of claim 2, wherein the plurality of classes are randomly selected as a subset from a set of classes, and wherein the set of classes includes the plurality of classes and one or more other classes.

4. The computer-implemented method of claim 1, wherein said maximizing step is capable of simultaneously pushing N-1 examples away from a single reference sample from among the N pairs of training examples, in the distribution space.

5. The computer-implemented method of claim 1, wherein said maximizing step is capable of simultaneously pushing N-1 examples towards a single reference sample from among the N pairs of training examples, in the distribution space.

6. The computer-implemented method of claim 1, wherein the deep convolutional neural network is configured to include embedding vectors that are trained to satisfy a set of constraints on each loss function in a set of loss functions, wherein the deep convolutional neural network is trained using the set of loss functions.

7. The computer-implemented method of claim 1, wherein said maximizing step comprising computing a gradient of a logarithm of the similarity score.

8. The computer-implemented method of claim 1, wherein said maximizing step maximizes an objective function for deep metric learning.

9. The computer-implemented method of claim 1, wherein a total number of the plurality of classes at least one of (i) changes over time, (ii) is larger than a threshold amount, and (iii) is unknown.

* * * * *